United States Patent [19]

Pulliam et al.

[11] 3,753,814

[45] Aug. 21, 1973

[54] CONFINEMENT OF BUBBLE DOMAINS IN FILM-SUBSTRATE STRUCTURES

[75] Inventors: George R. Pulliam; Paul J. Besser; Jack E. Mee; David M. Heinz, all of Orange County, Calif.

[73] Assignee: North American Rockwell Corporation, El Segundo, Calif.

[22] Filed: Dec. 28, 1970

[21] Appl. No.: 101,741

[52] U.S. Cl. .................... 156/3, 117/240, 340/174, 204/192

[51] Int. Cl. ....... H01f 1/09, H05k 3/06, H05k 3/08

[58] Field of Search ................ 117/106, 240; 156/2, 156/3, 17; 340/174; 204/192

[56] References Cited

UNITED STATES PATENTS

| | | | |
|---|---|---|---|
| 3,122,817 | 3/1964 | Andrus | 156/17 X |
| 3,429,740 | 2/1969 | Mee | 117/106 R |
| 3,647,538 | 3/1972 | Wolfe | 117/235 |
| 3,540,019 | 11/1970 | Bobeck et al. | 340/174 |

OTHER PUBLICATIONS

Perneski, Bell Tel. Labs Inc. Whippany, N.J., "Propagation of Cylindrical Magnetic Domains in Orthoferrites", IEE Ivans on Magnetic S, Mar. 5, 1969, pp. 554–557

Kurtzig, Bell Tel. Lab, Murray Hill, N.J., Shockley, Stanford Univ. Stanford, CA.Measurement of Domain Wall Energy of Orthoferrites, A.P. Physics, 39 11–1968 5619–5630

*Primary Examiner*—J. Steenberg
*Attorney*—L. Lee Humphries and H. Fredrick Hamann

[57] ABSTRACT

This invention described a method which controls the presence of bubble domains near the edge of a magnetic film in a film-substrate structure. The magnetic film is etched with a suitable etchant, for example boiling phosphoric acid, to provide a smooth, well-defined edge. The newly formed edge of the film repels the bubble domains therefrom thereby causing the bubble domains to be confined substantially to the center of the strip of film or to the center of the film disc.

8 Claims, 4 Drawing Figures

INVENTORS
GEORGE R. PULLIAM
PAUL J. BESSER
JACK E. MEE
DAVID M. HEINZ
BY Joseph E. Kieninger
ATTORNEY INVENTORS
GEORGE R. PULLIAM
PAUL J. BESSER
BY JACK E. MEE
DAVID M. HEINZ
Joseph E. Kieninger
ATTORNEY

CONFINEMENT OF BUBBLE DOMAINS IN FILM-SUBSTRATE STRUCTURES

BACKGROUND OF THE INVENTION

1. This invention relates to bubble domains and more particularly to a method of regulating the presence of bubble domains near the edge of a magnetic film of a film-substrate structure.

2. Description of Prior Art

Magnetic bubble domains in a sheet of magnetic medium, such as yttrium orthoferrite, are well known in the art and are described in U.S. Pat. No. 3,460,116 and others. Magnetic bubble domains in composite structures having a thin film of a substituted iron garnet on an oxide substrate are disclosed in the copending patent applications to Mee et al, U.S. Ser. Nos. 16,446, now U.S. Pat. No. 3,645,788 and 16,447. Movement of bubble domains in channels or strips of these magnetic films are disclosed in the copending patent application to Heinz, U.S. Ser. No. 81,232. These copending patent applications are incorporated herewith.

Films suitable for bubble domain use are formed conveniently by a chemical vapor deposition process as described in the copending patent application to Mee et al, U.S. Ser. No. 833,268, filed June 16, 1969. It is understood that the properties of the magnetic film and the magnitude of the bias field are such that stable bubble domains exist. In general, when films of this type are formed, the outer boundary or film edge is a sensitive site for the formation of unwanted crystal facets, for misoriented deposits, thicker deposits and other features which serve as domain nucleation and domain pinning points. When the films are thicker at the edge of the film the bubble domains tend to be attracted to or stick to the edge of the film.

SUMMARY OF THE INVENTION

It is the primary object of this invention to provide an improved method for confining bubble domains in film substrate structures.

It is another object of this invention to provide a method which confines substantially bubble domains to the center of a narrow strip or channel of the film material.

It is yet another object of this invention to provide a method for spacing bubble domains away from the edge of a strip of magnetic film.

It is yet still another object of this invention to provide a method for spacing bubble domains away from the edge of a disc of magnetic film.

It is still another object of this invention to provide a means of preventing unwanted formation or nucleation of bubble domains at the film edge or periphery of a magnetic film geometry.

It is a further object of this invention to eliminate reverse magnetic domain pinning at the edge or boundary of the film.

These and other objects of this invention are accomplished by a method in which the magnetic film on a magnetic film-substrate composite structure is etched with an etchant to provide a newly formed film edge. Bubble domains formed in such a film-substrate structure will have the tendency to be repelled from the newly-formed edge.

Other objects and advantages of this invention will be apparent from the following detailed description, reference being made to the accompanying drawings wherein preferred embodiments of the invention are shown:

IN THE DRAWINGS

DESCRIPTION OF ILLUSTRATIVE EMBODIMENTS

Figure 1:
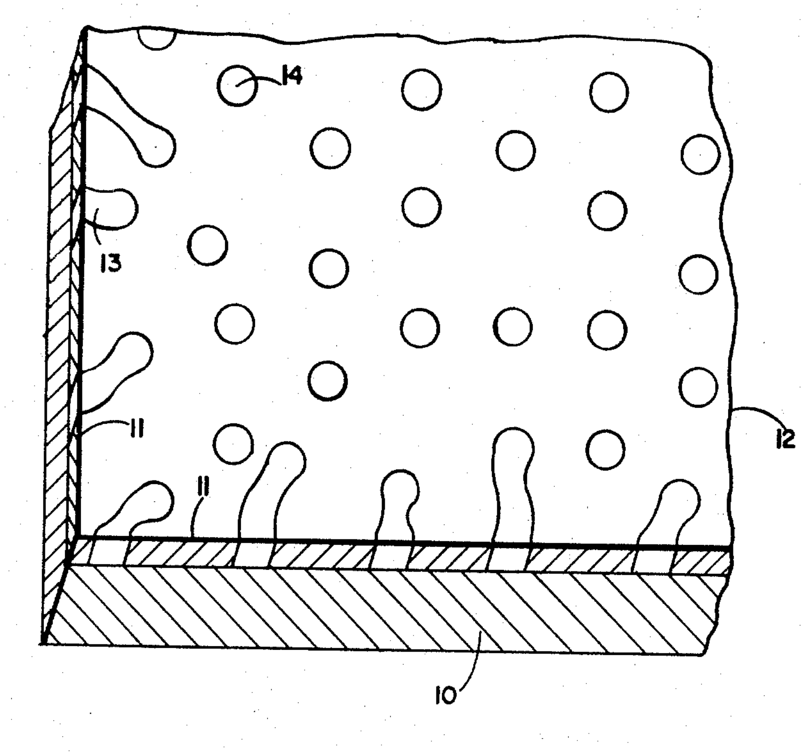
FIG. 1 is a cross-sectional view of a selected portion of a magnetic film-substrate composite structure having bubble domains therein.

As shown in FIG. 1, a monocrystalline substrate 10 is subjected to a chemical vapor deposition step to provide a thin film of magnetic bubble domain material 12. The deposition step is carried out in accordance with the co-pending patent application Ser. No. 833,268, filed June 16, 1969, by Mee, et al., assigned to the Assignee of the present invention. This patent application is incorporated herewith by reference thereto.

The substrate 10 is a monocrystalline garnet having a $J_3Q_5O_{12}$ formulation wherein the J constituent of the wafer formulation is at least one element selected from the group consisting of cerium, praseodymium, neodymium, promethium, samarium, europium, gadolinium, terbium, dysprosium, holmium, erbium, thulium, ytterbium, lutetium, lanthanum, yttrium, calcium and bismuth; and the Q constituent of the wafer formulation is at least one element selected from the group consisting of indium, gallium, scandium, titanium, vanadium, chromium, manganese, rhodium, zirconium, hafnium, niobium, tantalum, aluminum, phosphorus, arsenic and antiomony.

Examples of substrate materials are $Y_{0.45}$, $Gd_{2.55}$, $Ga_5O_{12}$, $Dy_{0.65}Gd_{2.35}Ga_5O_{12}$ and $Sm_3Ga_5O_{12}$.

The film of bubble domain material is a single crystal garnet having a $J_3Q_5O_{12}$ formulation wherein the J constituent of the film formulation has at least one element selected from the group of cerium, praseodymium, neodymium, promethium, samarium, europium, gadolinium, terbium, dysprosium, holmium, erbium, thulium, ytterbium, lutetium, lanthanum and yttrium; the Q constituent of the film formulation is taken from the group consisting of iron, iron and aluminum, iron and gallium, iron and indium, iron and scandium, iron and titanium, iron and vanadium, iron and chromium, and iron and manganese.

Preferred film materials are iron garnets such as $Y_3Ga_{1.2}Fe_{3.8}O_{12}$ and $Tb_3Fe_5O_{12}$.

The composite iron garnet film-substrate structure has a film with a given magnetostriction constant and a given difference between the lattice constants of the film and substrate. This requirement is discussed in detail in the co-pending patent applications U.S. Ser. Nos. 101,786; 101,785; and 101,787 all filed December 28, 1970 by Mee, et al, which are incorporated herewith by reference thereto.

The film portion 12 shown in FIG. 1 has bubble domains 14 therein which are substantially uniformly spaced from each other away from the edge of the film as originally grown. These bubbles domains are formed by applying the appropriate magnetic field. Along the edge 11 of the originally grown film the domains 13 are serpentine and pinned thereto. In general, the bubble domains have a size, for example in substituted iron garnets, of about 0.00025 inches and are spaced a distance of about three times the bubble domain diameter from each other.

While garnets are the preferred materials for the substrate and the film, other oxide materials may be used for the substrate especially when the film is formed of an orthoferrite material.

Figure 2:
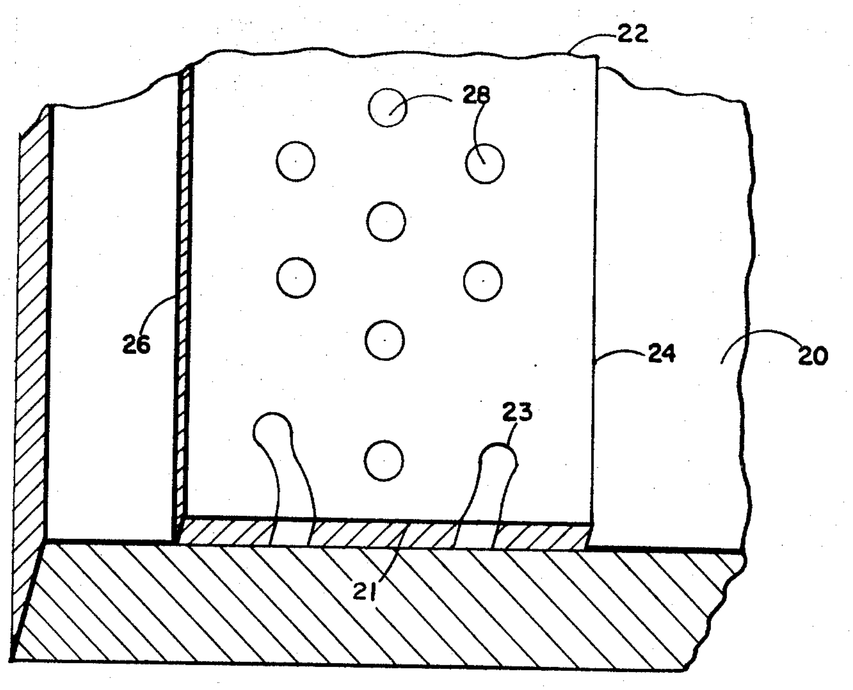
FIG. 2 is a cross-sectional view of an etched pattern of the composite structure shown in FIG. 1.

The composite film-substrate structure shown in FIG. 1 is then subjected to an etchant step using etchant photolithographic techniques of the type commonly used in the semiconductor industry and by employing an etchant such as phosphoric acid to form the edges 24 and 26 shown in FIG. 2. For example, the film portion 22 is covered with a thin layer of silicon dioxide between edges 24 and 26. Phosphoric acid does not attack the portion of film 22 between edge 24 and 26 whereas the film portions 12 (not shown) on the unmasked edge 24 and 26 are dissolved by the acid.

While chemical etching is a preferred manner of forming the new edge, other methods such as sputter etching, laser machining and the like may be used.

As shown in FIG. 2, the bubble domains 28 are in the center portion of film 22. The bubble domains 28 are repelled from the edges 24 and 26. The serpentine domains 23 remain pinned to imperfections along the unetched edge 21 but neither serpentine domains or bubble domains are present along the etched edges 24 and 26. The imperfections along the unetched edge 21 server as potential unwanted nucleation or bubble domain generation sites.

Figure 3:
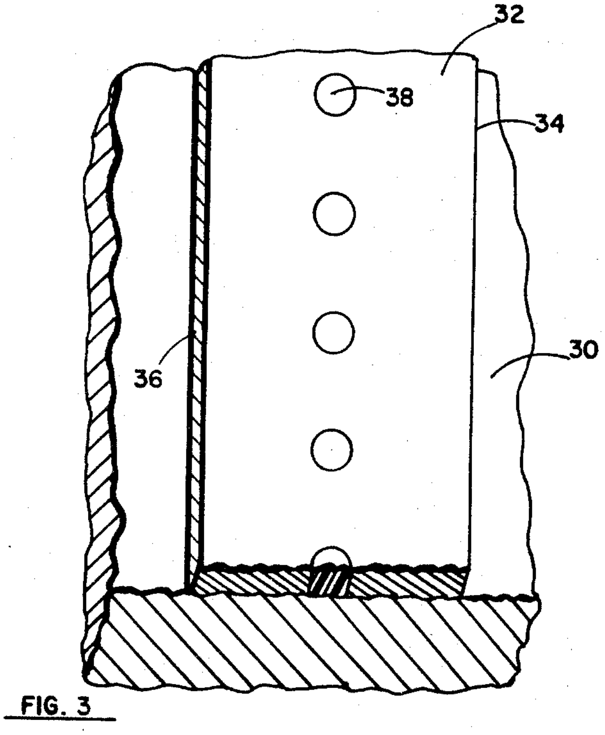
FIG. 3 is a cross-sectional view of a second etched pattern of the composite structure of the type shown in FIG. 1.

In FIG. 3, the film is etched to provide a relatively narrow film strip 32 on substrate 30 having edges 34 and 36. A single line of bubble domains 38 are spaced in the center of the strip 32 away from the edges 34 and 36.

Figure 4:
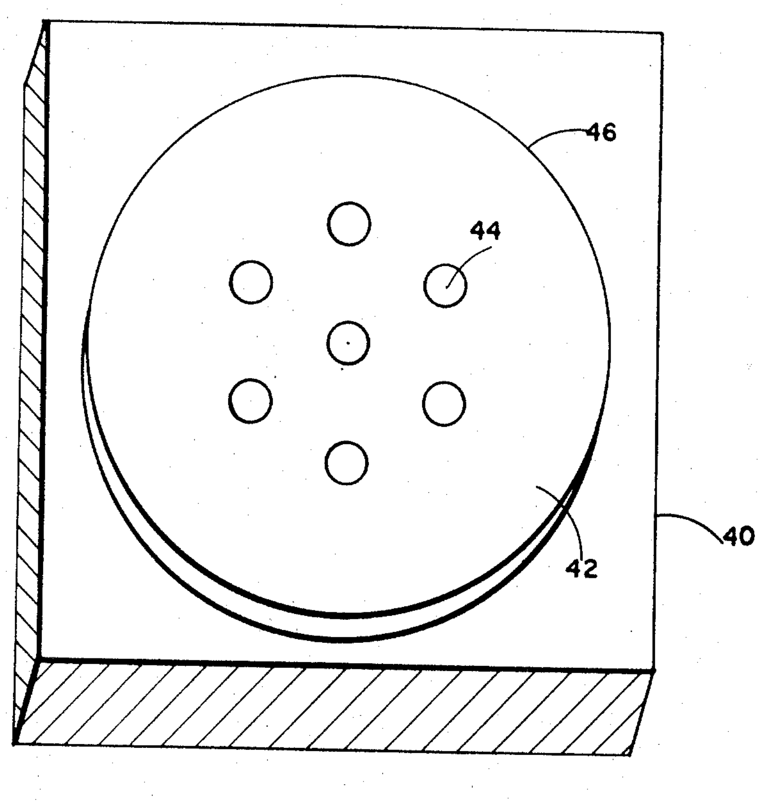
FIG. 4 is a cross-sectional view of a third etched pattern of the composite structure of the type shown in FIG. 1.

A film disc configuration is shown in FIG. 4. The film has been etched to form a disc 42 on the substrate 40. Bubble domains 44 are located in the center of disc 42 away from the edge of the disc 46.

As shown in FIGS. 2, 3 and 4, the bubble domains in the etched films tend to be spaced away from the etched edge of the film. This spacing, that is away from the outer film edge, provides a structure which lends itself to many specific bubble domain device applications.

Although several preferred embodiments have been described, it is understood that numerous other configurations may be etched in accordance with the principles of the invention.

We claim:

1. A method of confining bubble domains in a magnetic film of bubble domain material applied on a substrate comprising the steps of removing completely the original perpendicular edge of the film to provide a smooth, well-defined edge whereby the bubble domains are repelled from said smooth, well-defined edge of said film.

2. A method of confining bubble domains in a magnetic film of bubble domain material applied on a substrate comprising the steps of etching the film perpendicularly to provide a smooth, well-defined edge whereby bubble domains are repelled from said edge of said film by complete removal of said original edge material.

3. A method as described in claim 2 whereby said film is etched with phosphoric acid.

4. A method as described in claim 2 whereby said film is etched by a sputtering technique.

5. A method of preventing unwanted bubble domain nucleation in a magnetic film of bubble domain material applied on a substrate comprising the steps of removing completely the origninal edge of the film to provide a smooth, well-defined edge whereby the imperfections associated with the original edge that cause uncontrolled nucleation are no longer present.

6. A method of preventing unwanted bubble domain nucleation in a magnetic film of bubble domain material applied on a substrate comprising the steps of etching the film to provide a smooth, well-defined edge whereby the imperfections associated with the original edge that cause uncontrolled nucleation are no longer present by completely removing said original edge.

7. A method as described in claim 6 whereby said film is etched with phosphoric acid.

8. A method as described in claim 6 whereby said film is etched by a sputtering technique.

* * * * *

PO-1050
(5/69)

UNITED STATES PATENT OFFICE
CERTIFICATE OF CORRECTION

Patent No. 3,753,814 Dated August 21, 1973

Inventor(s) George R. Pulliam; Paul J. Besser; Jack E. Mee; David M. Heinz

It is certified that error appears in the above-identified patent and that said Letters Patent are hereby corrected as shown below:

In ABSTRACT, line 1, change "described" to -- describes --.

Column 1, line 5, after "1" insert -- Field of the Invention --, line 5, begin new paragraph with -- This --.

Column 3, line 33, change "server" to -- serve --.

Signed and sealed this 26th day of February 1974.

(SEAL)
Attest:

EDWARD M.FLETCHER,JR.
Attesting Officer

C. MARSHALL DANN
Commissioner of Patents